(12) United States Patent
Preisler et al.

(10) Patent No.: US 8,808,828 B2
(45) Date of Patent: Aug. 19, 2014

(54) CARGO MANAGEMENT SYSTEM INCLUDING A VEHICLE LOAD FLOOR TO COMPARTMENTALIZE A CARGO AREA

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 57 days.

(21) Appl. No.: 13/686,362

(22) Filed: Nov. 27, 2012

(65) Prior Publication Data

US 2013/0278002 A1   Oct. 24, 2013

Related U.S. Application Data

(63) Continuation-in-part of application No. 13/523,253, filed on Jun. 14, 2012, which is a continuation-in-part of application No. 13/453,201, filed on Apr. 23, 2012, now Pat. No. 8,690,233, application No. 13/686,362, which is a continuation-in-part of application No. 13/453,269, filed on Apr. 23, 2012.

(51) Int. Cl.
| | |
|---|---|
| *B60R 5/00* | (2006.01) |
| *B60R 5/04* | (2006.01) |
| *B32B 3/12* | (2006.01) |
| *B32B 3/26* | (2006.01) |

(52) U.S. Cl.
CPC ............ *B60R 5/00* (2013.01); *B32B 2262/0253* (2013.01); *B60R 5/04* (2013.01); *B32B 3/12* (2013.01); *B32B 2605/00* (2013.01); *B32B 3/263* (2013.01)

USPC .......... 428/99; 296/39.1; 296/39.2; 296/39.3; 296/97.23; 428/95; 428/98

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS

| | | | |
|---|---|---|---|
| 5,298,694 | A | 3/1994 | Thompson et al. |
| 5,502,930 | A | 4/1996 | Burkette et al. |

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

Cargo management system including a vehicle load floor to compartmentalize a cargo area into an upper compartment and a covered lower compartment is provided. The system includes a composite plastic first outer layer having a substantially planar upper support surface to support cargo in the upper compartment. A composite plastic second outer layer has at least one cavity defined by lower surfaces of the second outer layer. Each cavity has a size and shape which corresponds in size and shape to a vehicle component to restrain movement of the vehicle component and to prevent sudden transfer of vehicle component weight during vehicle acceleration and deceleration. A core including adjacent core portions has different thicknesses. At least one of the core portions has a large number of cavities and each of the core portions is positioned between and bonded to the outer layers by press molding to form corresponding panel portions.

23 Claims, 5 Drawing Sheets

(56) References Cited

U.S. PATENT DOCUMENTS

| | | |
|---|---|---|
| 5,915,445 A | 6/1999 | Rauenbusch |
| 5,979,962 A | 11/1999 | Balentin et al. |
| 6,050,630 A | 4/2000 | Hochet |
| 6,102,464 A | 8/2000 | Schneider et al. |
| 6,435,577 B1 | 8/2002 | Renault |
| 6,537,413 B1 | 3/2003 | Hochet et al. |
| 6,631,785 B2 | 10/2003 | Khambete et al. |
| 6,655,299 B2 | 12/2003 | Preisler et al. |
| 6,659,223 B2 | 12/2003 | Allison et al. |
| 6,682,675 B1 | 1/2004 | Vandangeot et al. |
| 6,682,676 B1 | 1/2004 | Renault et al. |
| 6,720,058 B1 | 4/2004 | Weeks et al. |
| 6,748,876 B2 | 6/2004 | Preisler et al. |
| 6,790,026 B2 | 9/2004 | Vandangeot et al. |
| 6,793,747 B2 | 9/2004 | North et al. |
| 6,823,803 B2 | 11/2004 | Preisler |
| 6,843,525 B2 | 1/2005 | Preisler |
| 6,890,023 B2 | 5/2005 | Preisler et al. |
| 6,918,625 B2 | 7/2005 | Storto et al. |
| 6,926,348 B2 | 8/2005 | Krueger et al. |
| 6,945,594 B1 | 9/2005 | Bejin et al. |
| 6,981,863 B2 | 1/2006 | Renault et al. |
| 7,014,259 B2 | 3/2006 | Heholt |
| 7,059,646 B1 | 6/2006 | DeLong et al. |
| 7,090,274 B1 | 8/2006 | Khan et al. |
| 7,093,879 B2 | 8/2006 | Putt et al. |
| 7,264,685 B2 | 9/2007 | Katz et al. |
| 7,320,739 B2 | 1/2008 | Thompson, Jr. et al. |
| 7,399,515 B1 | 7/2008 | Thele |
| 7,402,537 B1 | 7/2008 | Lenda et al. |
| 7,419,713 B2 | 9/2008 | Wilkens et al. |
| 7,628,440 B2 | 12/2009 | Bernhardsson et al. |
| 7,837,009 B2 | 11/2010 | Gross et al. |
| 7,909,379 B2 | 3/2011 | Winget et al. |
| 7,918,313 B2 | 4/2011 | Gross et al. |
| 7,919,031 B2 | 4/2011 | Winget et al. |
| 8,117,972 B2 | 2/2012 | Winget et al. |
| 8,622,456 B2 | 1/2014 | Preisler et al. |
| 8,690,233 B2 | 4/2014 | Preisler et al. |
| 2003/0079659 A1* | 5/2003 | Preisler et al. ............... 108/51.3 |
| 2004/0037995 A1 | 2/2004 | Nicolai et al. |
| 2005/0189674 A1 | 9/2005 | Hochet et al. |
| 2006/0255611 A1 | 11/2006 | Smith et al. |
| 2008/0145635 A1 | 6/2008 | Stoll et al. |
| 2008/0185866 A1 | 8/2008 | Tarrant et al. |
| 2010/0026031 A1* | 2/2010 | Jouraku ..................... 296/37.16 |
| 2010/0060038 A1 | 3/2010 | Takakura et al. |
| 2011/0315310 A1 | 12/2011 | Trevisan et al. |
| 2013/0278002 A1 | 10/2013 | Preisler et al. |
| 2013/0278003 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280469 A1 | 10/2013 | Preisler et al. |
| 2013/0280472 A1 | 10/2013 | Preisler et al. |
| 2013/0280473 A1 | 10/2013 | Preisler et al. |
| 2013/0312652 A1 | 11/2013 | Preisler et al. |
| 2013/0316123 A1 | 11/2013 | Preisler et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0145465 A1 | 5/2014 | Preisler et al. |
| 2014/0145470 A1 | 5/2014 | Preisler et al. |
| 2014/0147617 A1 | 5/2014 | Preisler et al. |
| 2014/0147622 A1 | 5/2014 | Preisler et al. |

OTHER PUBLICATIONS

Office Action; related U.S. Appl. No. 13/686,362; date of mailing Mar. 25, 2014.

Office Action; related U.S. Appl. No. 13/523,253; date of mailing Mar. 25, 2014.

Office Action; related U.S. Appl. No. 13/688,972; date of mailing Mar. 28, 2014.

Office Action; related U.S. Appl. No. 13/687,232; date of mailing Mar. 28, 2014.

Office Action; related U.S. Appl. No. 13/689,809; date of mailing Mar. 31, 2014.

Office Action; related U.S. Appl. No. 13/687,213; date of mailing Mar. 31, 2014.

Office Action; related U.S. Appl. No. 13/690,265; date of mailing Mar. 31, 2014.

Office Action; related U.S. Appl. No. 13/762,904; date of mailing Apr. 8, 2014.

Office Action; related U.S. Appl. No. 13/762,800; date of mailing Apr. 8, 2014.

Office Action; related U.S. Appl. No. 13/762,861; date of mailing Apr. 9, 2014.

Office Action; related U.S. Appl. No. 13/690,566; date of mailing Apr. 9, 2014.

Office Action; related U.S. Appl. No. 13/762,832; date of mailing Apr. 11, 2014.

Office Action; related U.S. Appl. No. 13/762,921; date of mailing Apr. 14, 2014.

Notice of Allowance; related U.S. Appl. No. 13/686,388; date of mailing Apr. 15, 2014.

Related U.S. Appl. No. 13/690,566, filed Nov. 30, 2012.

Related U.S. Appl. No. 13/762,921, filed Feb. 8, 2013.

Related U.S. Appl. No. 13/762,956, filed Feb. 8, 2013.

Office Action; related U.S. Appl. No. 13/453,201 (now USPN 8,690,233); date of mailing Nov. 20, 2013.

Office Action; related U.S. Appl. No. 13/523,209 (now USPN 8,622,456) date of mailing Apr. 29, 2013.

* cited by examiner

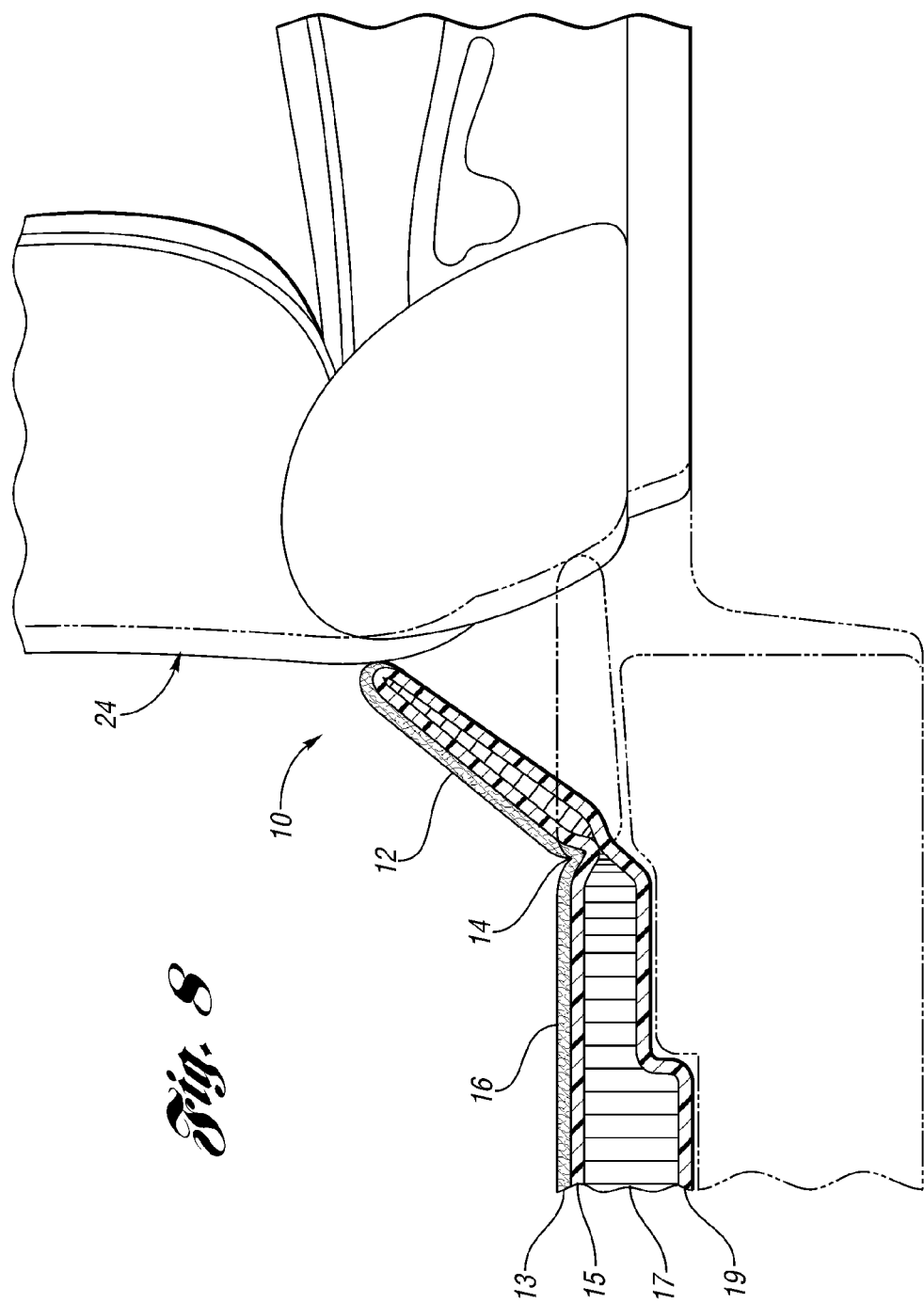

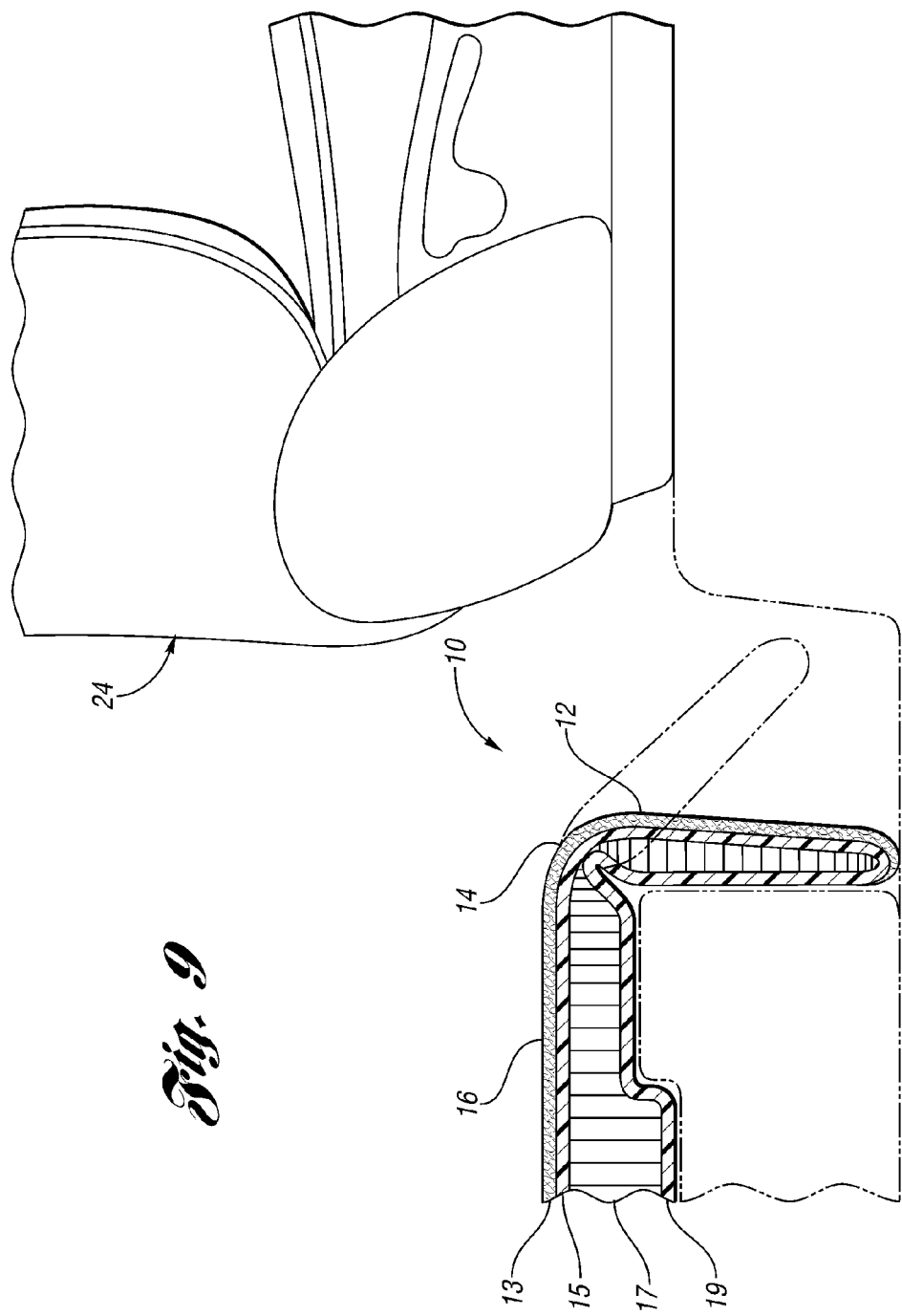

CARGO MANAGEMENT SYSTEM INCLUDING A VEHICLE LOAD FLOOR TO COMPARTMENTALIZE A CARGO AREA

CROSS-REFERENCE TO RELATED APPLICATIONS

This application is a continuation-in-part of U.S. patent application entitled "Carpeted, Vehicle Load Floor Including a Pivotable Cover Segmented Into Articulated, Sectional Members" filed Jun. 14, 2012 and having U.S. Ser. No. 13/523,253 which application is a continuation-in-part of both U.S. patent application entitled "Carpeted Automotive Vehicle Load Floor Having a Living Hinge" filed Apr. 23, 2012 and having U.S. Ser. No. 13/453,201 and U.S. patent application entitled "Method of Making a Sandwich-Type Composite Panel Having a Living Hinge and Panel Obtained by Performing the Method" also filed Apr. 23, 2012 and having U.S. Ser. No. 13/453,269.

TECHNICAL FIELD

This invention relates, in general, to the field of vehicle cargo management systems which have load floors and, in particular, to such systems having load floors which divide cargo areas into upper and lower compartments.

Overview

The trunk of an automobile or car is typically the vehicle's main storage, luggage or cargo compartment. The use of retainers to retain cargo can prevent or reduce damage to the cargo, the cargo and its occupants during severe vehicle maneuvers by preventing sudden luggage or cargo weight transfer. Some vehicles are fitted with metal grids or guards to retain loose items in case of vehicle collision or during emergency braking and minor crash impacts.

Beyond carrying cargo, the trunk of most passenger vehicles commonly contains various other components often behind or below a load floor. These components may be accessed by the vehicle's occupants or service personnel through hatches in the load floor or by removing carpet and support boards, etc. Typical components include:
 emergency supplies;
 Spare tire;
 jack and lug wrench;
 on-board tool kit for do-it-yourself repairs;
 electronics for sound, video, GPS, etc.;
 Battery and hybrid energy store;
 fuse boxes;
 CNG/LPG tanks (for bivalent engines); and
 Additional folding, or 'third-row', seating.

Battery pack designs for Electric Vehicles (EVs) are complex and vary widely by manufacturer and specific application. However, they typically all incorporate a combination of several relatively simple mechanical and electrical component systems which perform the basic required functions of the pack.

The actual battery cells can have different chemistry, physical shapes, and sizes as preferred by various pack manufacturers. Each battery pack will invariably incorporate many discrete cells connected in series and parallel to achieve the total voltage and current requirements of the pack. Battery packs for all electric drive EVs can contain several hundred individual cells.

To assist in manufacturing and assembly, the large stack of cells is typically grouped into smaller stacks called modules. Several of these modules will be placed into a single pack. Within each module the cells are welded together to complete the electrical path for current flow. Modules can also incorporate cooling mechanisms, temperature monitors, and other devices. In most cases, modules also allow for monitoring the voltage produced by each battery cell in the stack by a Battery Management System (BMS).

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of a thermoplastics material, and a second skin also made of a reinforced thermoplastics material. The stack may also include one or more external covering layers made of a woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges typically are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and cost of the finished parts.

In addition, the fact that separate, external parts are mounted on a composite panel of the sandwich-type is a source of quality defects, and thus adds to the cost of making such panels.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,298,694; 5,502,930; 5,915,445; 5,979,962; 6,050,630; 6,102,464; 6,435,577; 6,537,413; 6,631,785; 6,655,299; 6,659,223; 6,682,675; 6,793,747; 6,748,876; 6,790,026; 6,682,676; 6,823,803; 6,823,803; 6,843,525; 6,890,023; 6,918,625; 6,981,863; 7,014,259; 7,059,646; 7,090,274; 7,093,879; 7,264,685; 7,320,739; 7,402,537; 7,419,713; 7,837,009; 7,909,379; 7,918,313; 7,919,031; 8,117,972; 2006/0255611; 2008/0145635; 2008/0185866 and 2011/0315310.

One problem associated with prior art cargo management systems including load floors in the automotive industry is that typically separate cargo management organization and/or restraint subsystems must be provided below the load floor to manage, organize, secure and maintain vehicle components stored therein.

SUMMARY OF EXAMPLE EMBODIMENTS

An object of at least one embodiment of the present invention is to provide a cargo management system including a vehicle load floor wherein the load floor is sized and shaped to manage, organize, secure and restrain cargo stored beneath the load floor without the need for separate cargo management, organization and/or restraint subsystems.

In carrying out the above object and other objects of at least one embodiment of the present invention a cargo management system including a vehicle load floor to compartmentalize a cargo area into an upper compartment and a covered lower compartment is provided. The system includes a composite plastic first outer layer having a substantially planar upper support surface to support cargo in the upper compartment. The system also includes a composite plastic second outer layer having at least one cavity defined by lower surfaces of the second outer layer. The at least one cavity has a size and shape which corresponds in size and shape to a vehicle component to restrain movement of the vehicle component and to prevent sudden transfer of vehicle component weight during vehicle acceleration and deceleration. The system further includes a core having adjacent core portions within different thicknesses. At least one of the core portions has a large number of cavities and each of the core portions is positioned between and bonded to the outer layers by press molding to form corresponding panel portions.

The core may include first, second and third adjacent core portions having first, second and third thicknesses, respectively. The first and second thicknesses are different from each other and the second and third thicknesses are different from each other. The first, second and third core portions are positioned between and bonded to the outer layers by press molding to form first, second and third panel portions, respectively.

At least two of the core portions may have a large number of cavities.

The first panel portion may be pivotally connected to the second panel portion.

The system may further include a first living hinge which allows the second panel portion to pivot between different use positions relative to the first panel portion.

The third panel portion may be pivotally connected to the second panel portion.

The system may further include a second living hinge which allows the third panel portion to pivot between different use positions relative to the second panel portion. The system may further include a substantially continuous carpet layer bonded to an outer surface of the first outer layers to at least partially form a carpeted cargo management system.

The first living hinge may include a portion of the carpet layer.

The second living hinge may include a portion of the carpet layer.

The system may be a carpeted, thermoplastic, cargo management system.

The carpet layer may be a thermoplastic carpet layer wherein the thermoplastic of the system including the carpet layer is polypropylene.

The thickness of each of the panel portions may be in a range of 5 to 25 mm.

Each of the core portions may comprise a cellular core portion.

Each of the core portions may comprise a thermoplastic honeycomb core portion.

Each of the core portions may comprise a honeycomb core portion.

Each of the core portions may comprise a thermoplastic core portion.

The third panel portion may be a close-out panel portion.

Each of the core portions may have a large number of cavities.

Further in carrying out the above object and other objects of at least one embodiment of the present invention, a cargo management system including a vehicle load floor to compartmentalize a cargo area into an upper compartment and a covered lower compartment is provided. The system includes a composite plastic first outer layer having a substantially planar upper support surface to support cargo in the upper compartment. The system also includes a composite plastic second outer layer having at least one cavity defined by lower surfaces of the second outer layer, the at least one cavity having a size and shape which corresponds in size and shape to a vehicle component to restrain movement of the vehicle component and to prevent sudden transfer of vehicle component weight during vehicle acceleration and deceleration. The system further includes a core including first, second and third adjacent core portions having first, second and third thicknesses, respectively. At least two of the core portions have a large number of cavities wherein the first and second thicknesses are different from each other and the second and third thicknesses are different from each other. The first, second and third core portions are positioned between and bonded to the outer layers by press molding to form first, second and third panel portions, respectively.

Still further in carrying out the above object and other objects of at least one embodiment of the present invention, a cargo management system including a vehicle load floor to compartmentalize a cargo area into an upper compartment and a covered lower compartment is provided. The system includes a composite plastic first outer layer having a substantially planar upper support surface to support cargo in the upper compartment. The system also includes a composite plastic second outer layer having at least one cavity defined by lower surfaces of the second outer layer. The at least one cavity has a size and shape which corresponds in size and shape to a vehicle component to restrain movement of the vehicle component and to prevent sudden transfer of vehicle component weight during vehicle acceleration and deceleration. The system further includes a core including adjacent core portions having different thicknesses. At least one of the core portions has a large number of cavities and each of the core portions is positioned between and bonded to the outer layers by press molding to form corresponding first and second panel portions. The first panel portion is pivotally connected to the second panel portion. The system still further includes a first living hinge which allows the second panel portion to pivot between different use positions relative to the first panel portion.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 8 is a side view, partially broken away and in cross sections, taken along lines 8-8 of FIG. 5 and showing a close-out panel portion securing yet another vehicle component; and FIG. 9 is a view, similar to the view of FIG. 8, but showing a panel portion which secures and encloses a different vehicle component.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
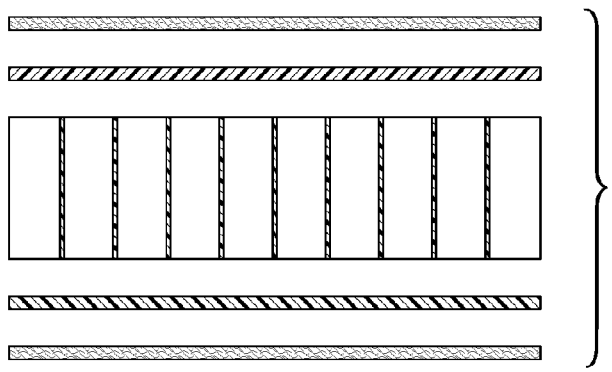
FIG. 1 is a side sectional view showing various separate layers of a prior art stack of thermoplastic-based layers of material.
Figure 2:
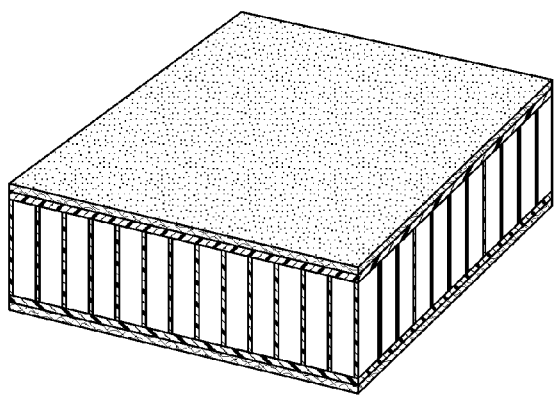
FIG. 2 is a top perspective sectional view of the stack of FIG. 1 after compression molding.
Figure 3:
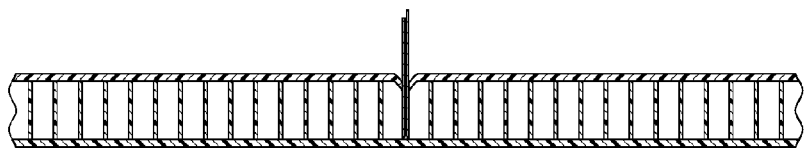
FIGS. 3 and 4 are side views, partially broken away and in cross section, of a prior art sandwich-type composite panel having a living hinge and method of making the living hinge.
Figure 4:
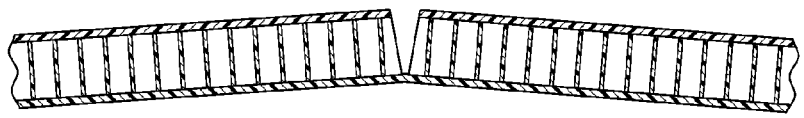
Figure 5:
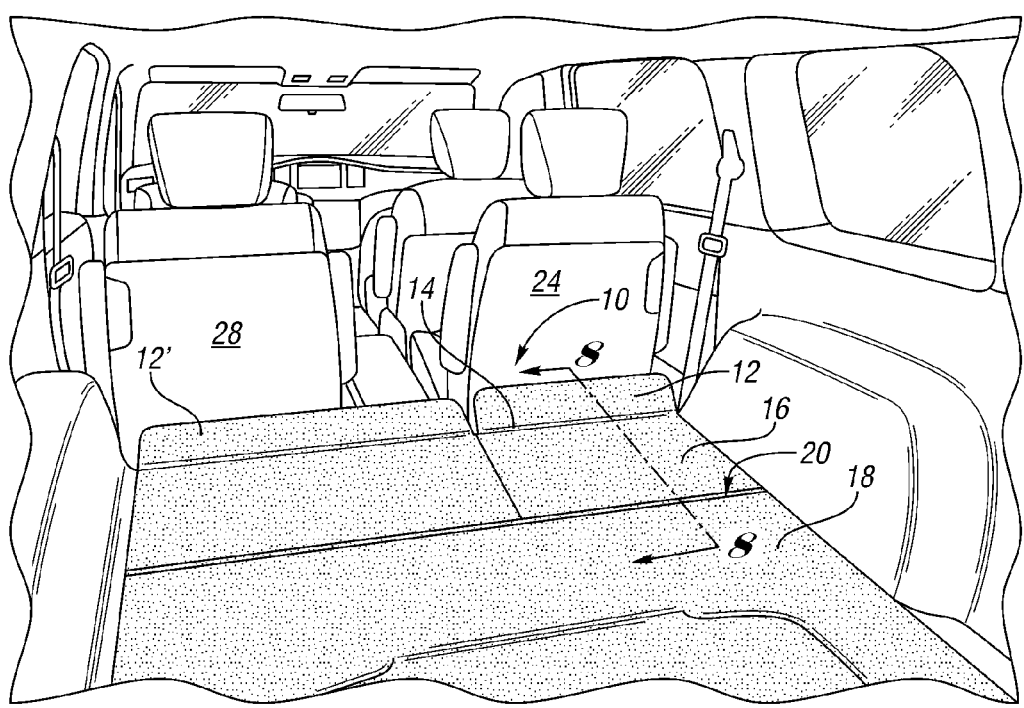
FIG. 5 is an environmental view, partially broken away, of a carpeted automotive vehicle load floor including a pair of carpeted, sandwich-type, compression-molded, composite panels each having a pivotable carpeted cover segmented into articulated, sectional members constructed in accordance with at least one embodiment of the present invention.

Referring now to FIG. 5, an embodiment of a cargo management system including an automotive vehicle load floor is shown. The system includes a pair of carpeted, compression-molded, sandwich-type, composite hinged panels, generally indicated at 10. Each panel 10 typically includes panel portions 12, 16 and 18. A living hinge 14 pivotally connects the panel portions 12 and 16 and a living hinge 20 pivotally connects the portions 16 and 18. The panel portion 12 may operate as a close-out panel against a vehicle seat 24. A different panel portion 12' may operate as a different close-out panel against a vehicle seat 28. However, it is to be understood that one or more hinged panels 10 constructed in accordance with at least one embodiment of the present invention may be used in a wide variety of environments besides the automotive vehicle environment of FIG. 5.

Referring to FIGS. 6, 7, 8, and 9, each hinged panel 10 is typically manufactured by providing a stack of material located or positioned within a mold. The stack includes first and second reinforced thermoplastic skins or outer layers 15 and 19, respectively, a core having a large number of cavities such as a thermoplastic cellular core 17 disposed between and bonded to the skins 15 and 19 by press molding. A substantially continuous covering or carpet layer 13 made of thermoplastics material covers and is bonded to the first skin 15 which provides a top support surface. The skins 15 and 19 are heated typically outside of the mold to a softening temperature. The mold is preferably a low-pressure, compression mold which performs a thermo-compression process on the stack of materials.

A living hinge 30 (FIG. 6) may be provided to pivotally connect panel portions of different thickness.

A portion 32 (FIG. 7) of the composite panel 10 is crushed at a predetermined location simultaneously with the step of applying the pressure to compact and reduce the thickness of the cellular core 17 at the predetermined location to form a depression or cavity having a size and shape which corresponds in size and shape to a vehicle component (as indicated by phantom lines) to restrain movement of the vehicle component and prevent sudden transfer of vehicle component weight during vehicle acceleration and deceleration.

The carpet layer 13 may be a resin carpet and the resin may be polypropylene. The carpet layer 13 may be made of a woven or nonwoven material (typically of the carpet type).

The cellular core 17 may be a honeycomb core. In this example, the cellular core 17 has an open-celled structure of the type made up of tubes or a honeycomb, and it is made mainly of polyolefin and preferably of polypropylene. It is also possible to use a cellular structure having closed cells of the foam type. The panel portion 12 may be made of a different material(s), such as a solid or hollow thermoplastic plastic part, to which the carpet layer 13 is bonded.

Each of the skins 15 and 19 may be fiber reinforced. The thermoplastic of the skins 15 and 19, the covering layer 13 and the core 17 may be polypropylene. At least one of the skins 15 and 19 may be a woven skin, such as polypropylene skin. Each of the skins 15 and 19 may be reinforced with fibers, e.g., glass fibers, carbon fibers or natural fibers. At least one of the skins 15 and 19 may advantageously be made up of woven glass fiber fabric and of a thermoplastics material.

Figure 6:
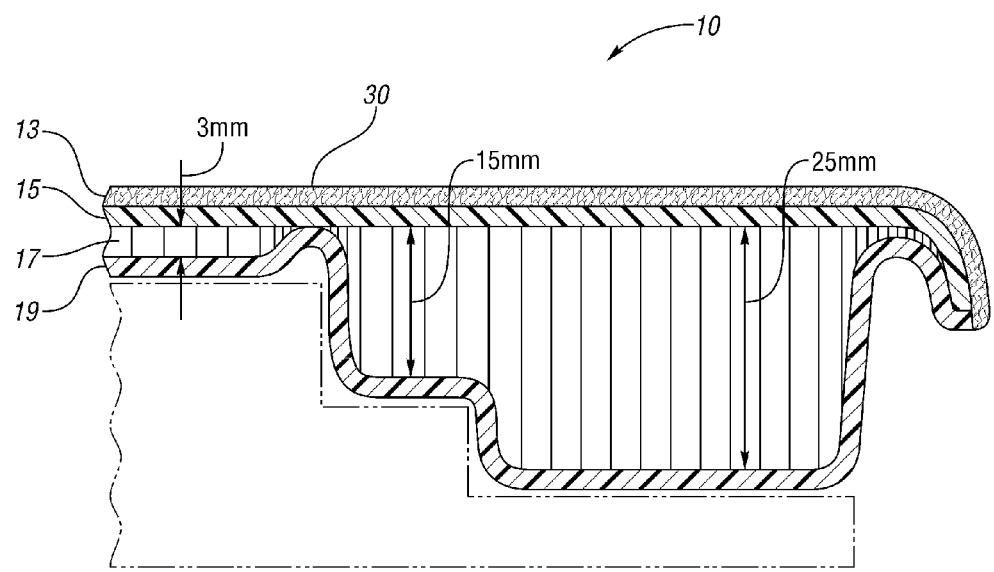
FIG. 6 is a side view, partially broken away and in cross section, of a carpeted load floor securing a vehicle component shown by phantom lines.
Figure 7:
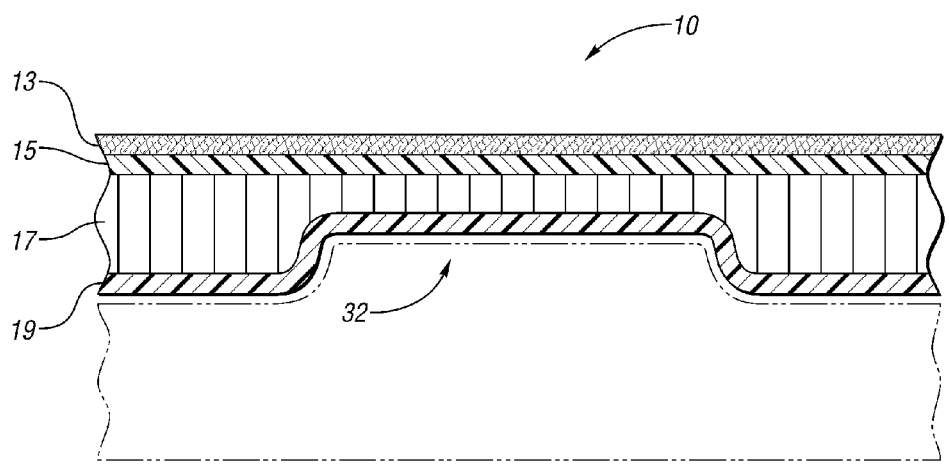
FIG. 7 is a view, similar to the view of FIG. 6, of a different carpeted load floor securing a different vehicle component.

The core portion corresponding to each panel portion may have a thickness in the range of 3 to 25 mm (as shown in FIG. 6) and crushed portions of the carpeted panel 10 may have a thickness in the range of 6 to 18 mm. The depressions or cavities corresponding to the crushed portions correspond to different heights or widths of a vehicle component stored in the covered lower compartment of the cargo area.

In one example method of making the hinged panel 10, stacks of material may be pressed in a low pressure, cold-forming mold. The stack is made up of the first skin 15, the cellular core 17, the second skin 19 and the covering layer 13, and is pressed at a pressure lying in the range of $10 \times 10^5$ Pa. to $30 \times 10^5$ Pa. The first and second skins 15 and 19 are preferably pre-heated to make them malleable and stretchable. Advantageously, in order to soften the first and second skins 15 and 19, respectively, heat is applied to a pre-assembly constituted by the stack made up of at least the first skin 15, of the cellular core 17, and the second skin 19. The first and second skins 15 and 19 have a forming temperature lying approximately in the range of 160° C. to 200° C., and, in this example, about 180° C. The living hinges may be formed by performing the method of the above-noted patent application entitled "Method of Making a Sandwich Type Composite Panel Having a Living Hinge and Panel Obtained by Performing the Method."

FIGS. 6-9 show different vehicle components (in phantom) having different sizes and shapes being stored in different sized and shaped covered lower compartments of a cargo area. By strategically crushing different portions of each panel 10, the panel 10 can receive and retain the different vehicle components. Also, by providing different living hinges, the different panel portions can have different use positions including storage use positions or use positions to allow one to remove a stored vehicle component from the lower compartment.

FIG. 8 shows a close-out panel example and FIG. 9 shows an example for enclosing one or more vehicle components at its top and side surfaces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cargo management system including a vehicle load floor to compartmentalize a cargo area into an upper compartment and a covered lower compartment, the system comprising:
    a composite plastic first outer layer having a substantially planar upper support surface to support cargo in the upper compartment;
    a composite plastic second outer layer having at least one cavity defined by component engaging lower surfaces of the second outer layer, each cavity having a size and shape which corresponds in size and shape to a vehicle component, the component engaging lower surfaces restraining movement of the vehicle component and preventing sudden transfer of vehicle component weight during vehicle acceleration and deceleration without a need for a separate cargo management, organization or restraint subsystem beneath the load floor; and
    a core, including adjacent core portions having different thicknesses wherein at least one of the core portions has a plurality of cavities and each of the core portions being positioned between and bonded to the first and second outer layers by press molding to form corresponding panel portions.

2. The system as claimed in claim 1 wherein the core includes first, second and third adjacent core portions having first, second and third thicknesses, respectively, and wherein the first and second thicknesses are different from each other and the second and third thicknesses are different from each other; the first, second and third core portions being positioned between and bonded to the outer layers by press molding to form first, second and third panel portions, respectively.

3. The system as claimed in claim 2, wherein at least two of the core portions have a plurality of cavities.

4. The system as claimed in claim 2, wherein the first panel portion is pivotally connected to the second panel portion.

5. The system as claimed in claim 2, further comprising a first living hinge which allows the second panel portion to pivot between different use positions relative to the first panel portion.

6. The system as claimed in claim 5, wherein the third panel portion is pivotally connected to the second panel portion.

7. The system as claimed in claim 6, further comprising a second living hinge which allows the third panel portion to pivot between different use positions relative to the second panel portion.

8. The system as claimed in claim 1, further comprising a substantially continuous carpet layer bonded to an outer surface of the first outer layer to at least partially form a carpeted cargo management system.

9. The system as claimed in claim 5, further comprising a substantially continuous carpet layer bonded to an outer surface of one of the outer layers to at least partially form a carpeted cargo management system.

10. The system as claimed in claim 7, further comprising a substantially continuous carpet layer bonded to an outer surface of one of the first and second outer layers to at least partially form a carpeted cargo management system.

11. The system as claimed in claim 9, wherein the first living hinge includes a portion of the substantially continuous carpet layer.

12. The system as claimed in claim 10, wherein the second living hinge includes a portion of the substantially continuous carpet layer.

13. The system as claimed in claim 8, wherein the system is a carpeted, thermoplastic, cargo management system.

14. The system as claimed in claim 13, wherein the carpet layer is a thermoplastic carpet layer and wherein the thermoplastic of the system including the carpet layer is polypropylene.

15. The system as claimed in claim 1, wherein thickness of each of the panel portions is in a range of 5 to 25 mm.

16. The system as claimed in claim 1, wherein each of the core portions comprises a cellular core portion.

17. The system as claimed in claim 1, wherein each of the core portions comprises a thermoplastic honeycomb core portion.

18. The system as claimed in claim 1, wherein each of the core portions comprises a honeycomb core portion.

19. The system as claimed in claim 1, wherein each of the core portions comprises a thermoplastic core portion.

20. The system as claimed in claim 2, wherein the third panel portion is a close-out panel portion.

21. The system as claimed in claim 2, wherein each of the core portions has a plurality of cavities.

22. A cargo management system including a vehicle load floor to compartmentalize a cargo area into an upper compartment and a covered lower compartment, the system comprising:
    a composite plastic first outer layer having a substantially planar upper support surface to support cargo in the upper compartment;
    a composite plastic second outer layer having at least one cavity defined by component engaging lower surfaces of the second outer layer, each cavity having a size and shape which corresponds in size and shape to a vehicle component, the component engaging lower surfaces restraining movement of the vehicle component and preventing sudden transfer of vehicle component weight during vehicle acceleration and deceleration without a need for a separate cargo engagement, organization or restraint subsystem beneath the load floor; and
    a core including first, second and third adjacent core portions having first, second and third thicknesses, respectively, wherein at least two of the core portions have a plurality of cavities and wherein the first and second thicknesses are different from each other and the second and third thicknesses are different from each other; the first, second and third core portions being positioned between and bonded to the first and second outer layers by press molding to form first, second and third panel portions, respectively.

23. A cargo management system including a vehicle load floor to compartmentalize a cargo area into an upper compartment and a covered lower compartment, the system comprising:
- a composite plastic first outer layer having a substantially planar upper support surface to support cargo in the upper compartment;
- a composite plastic second outer layer having at least one cavity defined by component restraining lower surfaces of the second outer layer, each cavity having a size and shape which corresponds in size and shape to a vehicle component, the component restraining lower surfaces restraining movement of the vehicle component and preventing sudden transfer of vehicle component weight during vehicle acceleration and deceleration without a need for a separate cargo management, organization or restraint subsystem beneath the load floor;
- a core including adjacent core portions having different thicknesses wherein at least one of the core portions has a plurality of cavities and each of the core portions being positioned between and bonded to the outer layers by press molding to form corresponding first and second panel portions wherein the first panel portion is pivotally connected to the second panel portion; and
- a first living hinge which allows the second panel portion to pivot between different use positions relative to the first panel portion.

* * * * *